United States Patent [19]

Kaszas et al.

[11] Patent Number: 5,169,914

[45] Date of Patent: Dec. 8, 1992

[54] UNIFORM MOLECULAR WEIGHT POLYMERS

[75] Inventors: Gabor Kaszas; Judit E. Puskas; Joseph P. Kennedy, all of Akron, Ohio

[73] Assignee: Edison Polymer Innovation Corporation, Brecksville, Ohio

[21] Appl. No.: 865,826

[22] Filed: Apr. 1, 1992

Related U.S. Application Data

[63] Continuation of Ser. No. 493,978, Mar. 15, 1990, abandoned, which is a continuation of Ser. No. 189,774, May 3, 1988, abandoned.

[51] Int. Cl.$^5$ ............................. C08F 4/14; C08F 4/16; C08F 10/10
[52] U.S. Cl. ................................... 526/135; 526/145; 526/146; 526/147; 526/193; 526/208; 526/209; 526/217; 526/222; 526/237; 526/348.7; 585/520; 585/525; 585/526; 585/527; 585/530; 585/9; 585/10
[58] Field of Search ............... 526/135, 145, 146, 147, 526/193, 208, 209, 217, 222, 237; 585/520, 525, 526, 527, 530

[56] References Cited

U.S. PATENT DOCUMENTS

| | | | |
|---|---|---|---|
| 4,568,732 | 2/1986 | Kennedy et al. | 526/206 |
| 4,611,037 | 9/1986 | Musch et al. | 526/135 |
| 4,663,406 | 5/1987 | Bronstert et al. | 526/204 |
| 4,814,405 | 3/1989 | Kennedy | 526/348.7 |
| 4,929,683 | 5/1990 | Kennedy et al. | 526/135 |

FOREIGN PATENT DOCUMENTS 265053A 4/1988 European Pat. Off. .
83241 2/1971 German Democratic Rep. .

OTHER PUBLICATIONS

Y. Marcus, Journal of Solution Chemistry, vol. 13, No. 9, 1984, 599–625.

Primary Examiner—Edward J. Smith
Attorney, Agent, or Firm—Oldham, Oldham & Wilson Co.

[57] ABSTRACT

A method for producing polymers with narrow molecular weight distribution which involves combining (1) an initiator component of the formula

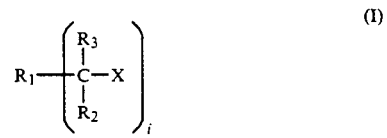

(I)

in which $R_1$, $R_2$, and $R_3$ are alkyl, aryl, or aralkyl groups, and can be the same or different, and X is an acetate, etherate, a hydroxyl group, or a halogen, and i is a positive whole number, (2) a Lewis acid of the formula $MX_n$ in which M is titanium, aluminum, boron, or tin, X is a halogen, and n is a positive whole number, (3) an electron donor component having an electron donor number of from at least about 25 to no more than about 50, (4) a solvent for the preceding and (5) a hydrocarbon monomer component.

10 Claims, No Drawings

UNIFORM MOLECULAR WEIGHT POLYMERS

This is a continuation of copending application Ser. No. 07/493,978 filed on Mar. 15, 1990 which is a continuation of Ser. No. 07/189,774 filed on May 3, 1988 both now abandoned.

TECHNICAL FIELD

This invention relates to processes for carrying out "living" polymerizations. More particularly, this invention relates to processes for preparing polymers having a relatively narrow molecular weight distribution. Specifically this invention relates to the synthesis of symmetrical telechelic polymers by a process capable of producing polymers whose ratio of weight average molecular weight, $\overline{M}_w$ to number average molecular weight, $\overline{M}_n$, approaches one.

BACKGROUND OF THE INVENTION

In co-pending application, Ser. No. 899,655 of some of the inventors herein, a new family of polymerization initiating systems is disclosed based on complexes formed from organic ethers, in conjunction with Lewis acids. Polymerizations conducted with such systems have been found to result in cationic polymerizations, sometimes termed "living" polymerizations, which polymerizations are terminalationless, and operate without chain transfer. Even though such polymerizations have produced polymers with fairly broad molecular weight distributions, the systems can be used to produce polymers of considerable commercial importance.

It has now been found possible, however, to conduct such polymerizations in a way in which the $\overline{M}_w/\overline{M}_n$ values of the polymers produced are relatively small, i.e., the molecular weight distribution of the resulting polymer molecules is particularly narrow. As is generally recognized, it is frequently desirable to prepare polymers having narrow molecular weight distributions for a variety of reasons, and polymers exhibiting such characteristics, for example, have been used as motor oil additives, as well as in paint formulations, to desirably improve the viscosity indices in such oils and paint. In addition, such polymers can be employed as calibration standards in connection with gel permeation chromatography, and in various other applications.

In the past, techniques such as, for instance, fractionation of polymeric materials exhibiting a broad spectrum of molecular weights have been resorted to in preparing polymers having a narrow molecular weight distribution. Inevitably, however, such methods are both laborious and expensive, and thus are undesirable at least for those reasons.

BRIEF DESCRIPTION OF THE INVENTION

In view of the foregoing, therefore, it is a first aspect of this invention to produce polymers having a relatively narrow range of molecular weight distribution.

A second aspect of this invention is to provide a process for preparing polymers in which the weight average molecular weight, to number average molecular weight, is less than about 1.5.

Another aspect of this invention is to provide a method for producing polymers having a relatively narrow range of molecular weight distribution, without resort to polymer separation techniques.

An additional aspect of this invention is to conduct telechleic polymerizations in such a way that polymeric product falling within a relatively narrow molecular weight range is produced in the first instance.

A further aspect of this invention is to reduce undesirable reactions within the polymerization reaction mixture, thereby maximizing the reaction required to produce the desired polymeric material.

The foregoing and other aspects of the invention are provided by a process comprising initiating a polymerization by combining an initiator component of the formula

in which $R_1$, $R_2$, and $R_3$ are alkyl, aryl, or aralkyl groups, and can be the same or different, and X is an acetate, an etherate, a hydroxyl group, or a halogen, and i is a positive whole number; a Lewis acid component of the formula $MX_n$ in which M is titanium, aluminum, boron, or tin, X is a halogen, and n is a positive whole number; an electron donor component having an electron donor number from at least about twenty-five to no more than about fifty; a hydrocarbon monomer component; and a solvent for said components, wherein said components are combined in amounts such that the number of moles of the Lewis acid component present at least about equals the number of combined moles of said initiator component and said electron donor component present; and at least about one mole of electron donor component is present for about every ten moles of initiator component present; and wherein the reaction solution thus formed is maintained at a temperature below about $-10°$ C. until the desired polymer has been formed, and wherein further, when the dielectric constant of said solvent is about equal to, or greater than about seven, said donor number is from at least about thirty to no more than about fifty, and when the said temperature is below about minus 60° C., said donor number is from at least about twenty-five to no more than about fifty.

The foregoing and other aspects of the invention are provided by a polymer produced by the process of the preceding paragraph wherein said polymer has a ratio of weight average molecular weight to number average molecular weight, of no more than about 1.5.

The foregoing and still other aspects of the invention are provided by polyisobutylene in which the ratio of weight average molecular weight, to number average molecular weight, is no more than about 1.15.

DETAILED DESCRIPTION OF THE INVENTION

Polymerizations of the type contemplated herein are carried out by the polymerization of olefins and diolefins in the presence of a polymerization initiator complex prepared in a solvent system using procedures found to minimize decomposition of the active centers of the complex, as well as reduce side reactions which lead to the formation of undesirable products. The initiator complexes employed in the invention comprise certain initiator compounds in combination with various Lewis acids, together with particular electron donor components. Inasmuch as the unwanted side reactions are eliminated or greatly minimized, molecular weight control of the polymeric product can be accomplished simply by adjusting the relative amounts of monomer and initiator present in the reaction mixture. The polymer will continue to grow as long as monomer is available for reaction, and as long as the monomer is not prevented from reacting with the growing center of the polymer by precipitation of the polymer from the reaction mixture caused by insolubility of the polymeric product, or terminated by the deliberate destruction of the active centers.

In conducting cationic polymerizations an initiator compound of the general formula (1) is combined with a Lewis acid in a solvent, and monomer is added to the system, thereby initiating a living polymerization. In the reaction, the initiator compound splits off its halogen, thereby becoming a carbocation, an active site to which the monomer present adds during the cationic polymerization process. The halogen combines with an associated Lewis acid molecule of the system to produce a counter-anion, or "gegenion". While the mechanism described, is the primary reaction of the system, unfortunately, other reactions take place concur-rently. For example, the carbocation has a tendency to split off one of its positively charged hydrogen atoms, forming a proton which creates a new polymerization reaction site. Such "protic" initiation also terminates the polymerization of the initial polymer chain. Both mechanisms give rise to unwanted variations in polymer molecular weight.

In other cases, the halogen originally attached to the gegenion returns to the carbocation, destroying the latter as a polymerization reaction site in a process referred to as irreversible termination. In still other cases, the growing carbocations have such a strong positive charge that they exhibit a pronounced affinity for the internal structure of the growing chain, leading to an internal reaction involving reaction of the end of the chain with the internal structure, referred to as "self-alkylation", a process, for example, producing unwanted indanyl groups. Polymers which have undergone self-alkylation not only interfere with formation of polymers having a uniform molecular weight, but the attachment of desirable functional endgroups, which require polymers with halogenated terminal ends, is prevented. Thus while cationic polymerizations may conveniently be used for the synthesis of polymers having molecular weights up to 100,000, and higher, unless the preceding competing reactions are avoided, the uniformity of the polymeric product produced is inferior, due to the different molecular weight polymer chains which result.

While not wishing to be bound by the theory, it is postulated that when electron pair donors exhibiting particular properties are added to the system, such donors share their electrons with the carbocations, thereby reducing their positive charge, as well as the positive charge of their terminal hydrogen atoms. This in turn, reduces the growing chain's latent tendency to split off protons, to react internally with themselves, or to accept reaction-terminating halogen atoms from the gegenions irreversibly.

A further advantage of moderating the reactivity of the growing chain and/or initiator compound by the addition of the electron donor compound is that the rate of polymer propagation is reduced relative to the rate of polymer initiation, favoring the formation of more uniform molecular weight distribution polymers.

A further disadvantage of carbocations having a high degree of reactivity stems from the fact that they tend to produce intermolecular alkylation in the case of diene polymerizations. Such side reactions cause the polymer chains to interact, forming highly branched, frequently insoluble polymers.

It is important that the electron donor be selected so that it has a sufficient donor strength to produce the action described, but one not so strong as to suppress the desired polymerization. In addition, it has been found that the strength of the donor is influenced by the temperature of the polymerization and the nature of the solvent in which the polymerization is conducted.

The tendency of, or "strength" of the electron pair donor to share its electrons with the initiator component has been referred to as its "donor number", DN, or sometimes its "donicity". The donor number is defined as the molar enthalpy value for the reaction of the donor with $SbCl_5$ as a reference acceptor in a $10^{-3}M$ solution of dichloroethane. While the use of some compounds capable of exerting an electron donor effect have previously been used in polymerization systems, the desirable effect achieved through the use of electron donor compounds exhibiting the donor number values taught by the invention has not previously been appreciated. Consequently, the compounds used in the past have been substantially weaker than the compounds found to be valuable for the purposes of the invention taught herein.

Although the required donicity of the electron pair donors of the invention will depend upon other factors associated with the polymerization reaction, as will be further explained in the following, it has been found that the donor number of the electron pair donor should be at least twenty five if the undesired reactions previously referred to are to be avoided, while it should not exceed a value of about fifty in order that practical reaction rates can be achieved.

Among the numerous electron pair donors suitable for use with the invention may be mentioned dimethyl acetamide, dimethyl formamide, dimethyl sulfoxide, hexamethylphosphoric triamide, N-methyl-2-pyrrolidinone, pyridine, tetramethylurea, and many others. Some typical electron pair donors and their donor numbers are listed by Viktor Gutman in "The Donor-Acceptor approach to Molecular Interactions", Plenum Press (1978).

It has also been found that both the temperature of the polymerization and the nature of the solvent selected for the reaction have a bearing on the nature of the electron pair-donor required to produce the desired polymeric product. For example, it has been found that in order to produce polymers in which the $\overline{M}_w/\overline{M}_n$ is maintained at about, or below 1.5, a relatively narrow molecular weight distribution, the polymerization should be conducted at a temperature below about $-10°$ C., and a preferred range is from about minus $40°$ C. to minus $80°$ C., although lower temperatures may be employed if desired. When the reaction is conducted over about minus $60°$ C. however, the donor number should be from at least thirty to no more than about fifty if desirable molecular weight distributions are to be achieved.

As indicated, the nature of the solvent also has an influence on the nature of the reaction. In this regard it has been found that there is a correlation between the polarity of the solvent, or mixture of solvents employed in the reaction, reflected by their dielectric constant, and the donor number of the electron pair donor most suitable for the reaction. For example, when the dielectric constant of the solvent system is about equal to, or greater than seven, it is desirable that the electron donor number have a value of from about thirty to fifty, while below such dielectric constant value, the donor number should be from twenty-five to about fifty. In the case of mixed solvents, the effective dielectric constant value for the mixture is determined on a weighted average basis. Suitable solvents include normal, branched, or cyclic hydrocarbons, including their halogen substituted derivative, mixtures of such compounds, and others. Suitable compounds include, for instance, n-hexane, n-pentane, n-heptane, ethyl chloride, methylene chloride, n-butyl chloride, benzene, cyclohexane, isopentane, mixtures of such compounds, and others.

Initiator compounds of the type contemplated by the invention comprise compounds of the general formula (1) where $R_1$, $R_2$, and $R_3$ are selected from the group consisting of alkyl, aryl, or arylkyl groups, and can be the same or different, and X is an acetate, etherate, hydroxyl group, or a halogen. Suitable compounds, include for example, cumyl, dicumyl and tricumyl halides, particularly the chlorides, i.e., 2-chloro-2-phenyl propane, i.e., cumylchloride;
1,4-di(2-chloro-2-propyl)benzene, i.e., di(cumylchloride);
1,3,5-tri(2-chloro-2-propyl)benzene, i.e., tri(cumylchloride);
2,4,4-trimethyl-2-chloro-pentane;
2-acetyl-2-phenyl-propane, i.e., cumyl acetate;
2-propionyl-2-phenyl-propane, i.e., cumyl propionate;
2-methoxy-2-phenyl propane, i.e., cumylmethyl ether;
1,4-di(2-methoxy-2-propyl)benzene, i.e., di(cumylmethyl ether);
1,3,5-tri(2-methoxy-2-propyl)benzene, i.e., tri(cumylmethyl ether), and similar compounds.

Any of various Lewis acids of the general formula $MX_n$ where M can be titanium, aluminum, boron, tin and others, and X is a halogen, are suitable for purposes of the invention. Such compounds include, but are not limited to the titanium and boron halides, particularly titanium tetrachloride, boron trichloride, aluminum trichloride, antimony pentachloride, antimony pentaflouride, boron triflouride, and others. Use of the titanium halides, is particularly preferred, however.

The amount of the Lewis acid present in the initiator system may vary; however, it is desirable that the number of moles of Lewis acid present at least be equal, preferably exceed the combined moles of the initiator compound and the electron donor compound present. Furthermore, at least one mole of donor compound should be present for every ten moles of initiator compound present, and the use of about equal moles of such compounds is preferred.

The invention is suited for the polymerization of hydrocarbon monomers, i.e., compounds containing only hydrogen and carbon atoms, especially olefins and diolefins, and normally those having from two to about twenty, but preferably from about four to eight carbon atoms. The process can be employed for the polymerization of such monomers to produce polymers of different, but uniform molecular weights, for example, from about three hundred to in excess of a million. Such polymers can be low molecular weight liquid or viscous polymers having a molecular weight of from about two hundred to ten thousand, or solid waxy to plastic, or elastomeric materials having molecular weights of from about a hundred thousand to a million, or more. Suitable monomeric materials include such compounds as isobutylene, styrene, beta pinene, isoprene, butadiene, substituted compounds of the preceding types, and others. The use of isobutylene has been found to produce polymers having particularly narrow ranges of molecular weight, however, and the polymerization process of the invention is especially adapted to the use of that monomer.

In order to minimize the undesirable reactions referred to, it is necessary that the initiator compound and Lewis acid not be present together with the monomer, in the absence of the electron donor compound.

While uninterrupted growth can be maintained for an extended period, in instances where termination is desired in order to prepare a polymer having a particular molecular weight range, termination can be induced either by increasing the temperature of the polymerization system and thus decomposing the active growing complex, or can be achieved by adding a nucleophilic terminating agent such as methanol, pyridine, ammonia, an alkylamine, and others.

While not intended to be limiting in nature, the following examples, in which the volume measurements recited describe the undiluted amount of the component referred to, are illustrative of the invention.

EXAMPLE 1

In this example a Lewis acid is combined with an initiator and an electron donor compound having a donor number of 17.1, lower than that required to produce the advantages of the initiator system contemplated by the invention. In the experiment, a 75 ml test-tube has added thereto as a mixed solvent 15 mls of hexane and 10 mls of methyl chloride. Thereafter, $1.0 \times 10^{-4}$ mole of cumyl chloride, the initiator compound, $1 \times 10^{-4}$ mole of ethyl acetate, the electron donor with a DN of 17.1, and $1.3 \times 10^{-2}$ mole of isobutylene, the monomer, are added to the solution in the order recited, the solution being maintained at minus 40° C. Polymerization is initiated by the addition of $1.8 \times 10^{-3}$ mole of titanium chloride, and is terminated after thirty minutes by the addition of 3 mls of pre-chilled methanol. Gel permeation chromatography of 0.33 gram of the product shows that only 72% by weight of the total product was formed by controlled initiation, while 28% by weight of polymer is produced by undesirable protic initiation.

EXAMPLE 2

In a similar experiment, to a 75 ml test-tube are added 25 mls of a solvent, methyl chloride, $1.0 \times 10^{-4}$ mole of an initiator, cumyl chloride, $1 \times 10^{-4}$ mole of an electron donor compound, ethyl acetate, and $1.3 \times 10^{-2}$ mole of isobutylene. The solution is maintained at minus 40° C., and the polymerization is initiated by the addition of $1.8 \times 10^{-3}$ mole of titanium tetrachloride. The reaction is terminated after ten minutes by the addition of 3 ml of pre-chilled methanol. Gel permeation chromatography of 0.68 grams of the product shows a broad high molecular weight peak equivalent to a $\overline{M}_n$ of 50,000, and a $\overline{M}_w/\overline{M}_n$ of 2.26. The results are typical of a polymer produced to a substantial degree by undesirable protic initiation.

Both examples 1 and 2 demonstrate that the use of ethyl acetate having an electron donor number of only 17.1 is incapable of sufficiently modifying the carbocation, thus resulting in the formation of polymers having poorly defined structures as a result of polymer initiation caused by protic impurities, which can include such materials as water, alcohol, amines, and the like.

The following examples 3 and 4 illustrate that by the use of a stronger electron pair donor initiation by protic impurities can be completely eliminated, and polymers with well defined structures can be synthesized.

EXAMPLE 3

In a further experiment, each of three 75 ml test-tubes have added thereto a mixed solvent consisting of 15 mls of hexane mixed with 10 mls of methyl chloride. To the solvent are then added $1 \times 10^{-4}$ mole of a cumyl chloride initiator, $1 \times 10^{-4}$ mole of dimethyl sulfoxide, the electron pair donor with a DN of 29.8, and $1.3 \times 10^{-2}$ mole of isobutylene monomer. The reaction, which is conducted at minus 40° C., is initiated by the addition of $1.8\ 10^{-3}$ mole of the Lewis acid titanium tetrachloride. The polymerization in the first test-tube is terminated by the addition of pre-chilled methanol after thirty minutes. An additional $1.3 \times 10^{-2}$ mole of isobutylene monomer is then added to the remaining test-tubes, the reaction in the second being terminated after an additional thirty minutes by methanol. A still further addition of $1.3 \times 10^{-3}$ mole of isobutylene is made to the third test-tube, following which the reaction is terminated after a further thirty minutes of reaction. Gel permeation chromatography analysis of the product shows the formation of a uniform polymer having a narrow molecular weight distribution, with no product present of the type formed by uncontrolled initiation.

Results are as follows:

| Sample | Yield (grams) | $\overline{M_n}$ | $\overline{M_w}/\overline{M_n}$ |
|---|---|---|---|
| 1. | 0.2008 | 2100 | 1.18 |
| 2. | 0.4290 | 6100 | 1.09 |
| 3. | 0.7878 | 8300 | 1.16 |

The fact that the polymerizations proceeded as would be expected in the case of polymerizations experiencing no chain transfer or termination, in other words, as a "living" polymerization, is substantiated by the fact that the molecular weights obtained from the product in all three test-tubes showed theoretical values, i.e., $$Mn = \frac{\text{grams of polymer formed}}{\text{number of initiator moles}}$$

Ultraviolet and nuclear magnetic resonance analysis of the product demonstrates that the chains were terminated on one end with a cumyl group, and on the other end with a tertiary chlorine atom.

EXAMPLE 4

In this example four 75 mm test-tubes are prepared and the reactions are carried out at minus 40° C. under conditions described in the following table 1.

TABLE 1

| Sample | Electron Pair Donor (Dimethylacetamide, DN-26.6) (moles) | Initiator (Cumylchloride) (moles) |
|---|---|---|
| 1. | $1 \times 10^{-4}$ | $1 \times 10^{-4}$ |
| 2. | " | " |
| 3. | " | " |
| 4. | " | " |

TABLE 1-continued

| Solvent #1 (Hexane) (ml) | Solvent #2 (Methylchloride) (ml) | Monomer (Isobutylene) (moles) |
|---|---|---|
| 15 | 10 | $2.6 \times 10^{-2}$ |
| 10 | 15 | " |
| 5 | 20 | " |
| — | 25 | " |

In each case, polymerization is initiated by the addition of $1.8 \times 10^{-3}$ mole of the Lewis acid titanium tetrachloride. After ten minutes the reactions are terminated by adding 3 mls of pre-chilled methanol. Analysis of the polymers produced by gel permeation chromatography indicates the following results, which indicate that only polymers with well defined structure were formed; no product indicating uncontrolled initiation being evident. Ultraviolet and nuclear magnetic resonance analysis of the product displays the cumyl and tertiary chlorine endings which would be expected in a living polymerization.

TABLE 2

| Sample | Yield (grams) | $\overline{M_n}$ | $\overline{M_w}/\overline{M_n}$ |
|---|---|---|---|
| 1. | 0.1059 | 1300 | 1.07 |
| 2. | 0.5457 | 6700 | 1.13 |
| 3. | 1.4048 | 15400 | 1.13 |
| 4. | 1.4328 | 14400 | 1.21 |

EXAMPLE 5

The following experiment is carried out to demonstrate the inhibiting effect which the presence of a strong electron pair donor, for example, dimethyl acetamide, or dimethyl sulfoxide, has on a reaction system which includes protogenic impurities such as water. The experiments are carried out according to the procedure of the preceding examples, with the exception that no initiator compound is included. Three samples are tested as shown in the following table.

TABLE 3

| Sample | Electron pair donor (dimethyl sulfoxide-*, dimethyl acetamide-**) (moles) | Solvent #1 (n-hexane((ml)) |
|---|---|---|
| 1. | *$1 \times 10^{-4}$ | 15 |
| 2. | **$1 \times 10^{-4}$ | 0 |
| 3. | *$1 \times 10^{-4}$ | 0 |

| Solvent #2 (Methyl chloride) (ml) | Monomer (isobutylene) (moles) | Lewis Acid (titanium-tetrachloride-*,) boron-trichloride-**) (moles) |
|---|---|---|
| 10 | $2.6 \times 10^{-2}$ | *$1.8 \times 10^{-3}$ |
| 25 | " | **$1.8 \times 10^{-3}$ |
| 25 | " | *$1.8 \times 10^{-2}$ |
| Reaction Time (Minutes) | | |
| 30 | | |
| 30 | | |
| 30 | | |

Despite the presence of water, a protogenic impurity, no polymer is formed, due to the suppression of protic initiation by the presence of the electron pair donor.

However, in a set of duplicate experiments in which the electron pair donor, either dimethyl sul-foxide or dimethyl acetamide, was excluded, the water present initiated protic polymerization, 100% conversion of the monomer being achieved in the case of titanium tetrachloride, and 18% conversion in the case of boron trichloride. In other words, the experiment demonstrates that the presence of strong electron pair donors can totally suppress protic initiation, regardless of the relatively nonpolar nature of the solvent mixture employed, or the Lewis acid used. From a practical standpoint, the example shows that cationic polymerizations can be carried out according to the method of the invention without any necessity to carefully purify the reaction mixture components so as to exclude protogenic impurities, thereby avoiding any need for costly purification procedures. As previously pointed out, the extreme reactivity of living polymerization initiator systems has previously been disadvantageous due to the side reactions and by-products that tend to result. Heretofore, such high reactivity has necessitated the use of polymerization mediums of the highest purity, and the elimination of even trace impurities.

EXAMPLE 6

Additional experiments are carried out involving a variety of initiator compounds in the following. The polymerizations are carried out at minus 40° C. in 75 ml test-tubes, as in the case of the preceding experiments. Three test-tubes are prepared, each of which contains $1 \times 10^{-4}$ mole of dimethyl sulfoxide, 15 mls of n-hexane solvent mixed with 10 mls of methyl chloride solvent, and the additional components listed in the following table.

TABLE 4

| Sample (isobutylene) (moles) | Initiator Compound (cumylmethyl ether-*, cumyl acetate-, 2-chloro-2,4,4-trimethylpentane-*) (ml) | Monomer |
|---|---|---|
| 1. $10^{-2}$ | *$1.25 \times 10^{-4}$ | $2.6 \times$ |
| 2. $10^{-2}$ | **$1.25 \times 10^{-4}$ | $2.6 \times$ |
| 3. 0.104 | ***$0.9 \times 10^{-4}$ | |

| Lewis acid (titanium tetrachloride) (moles) | Reaction Time (Minutes) |
|---|---|
| $1.8 \times 10^{-3}$ | 30 |
| $1.8 \times 10^{-3}$ | 30 |
| $1.8 \times 10^{-3}$ | 120 |

Analysis of the resulting polymers gives following results.

TABLE 5

| Sample | Yield (grams) | $\overline{Mn}$ | $\overline{Mw}/\overline{Mn}$ |
|---|---|---|---|
| 1. | 0.1937 | 1670 | 1.21 |
| 2. | 0.2112 | 1840 | 1.18 |
| 3. | 0.7572 | 8600 | 1.08 |

Analysis by nuclear magnetic resonance shows the presence of tertiary chlorine groups on one end of the polymer chains and cumyl head group structures on the other end. The molecular weights are those theoretically expected, i.e., $$Mn = \frac{\text{grams polymer form}}{\text{number of initiator moles}}.$$

It has previously been known that uncontrolled initiation, chain transfer, and inter and intra chain reactions can be reduced by carrying out the living polymerizations at lower temperatures. However, as can be seen from the above that when the strong electron pair donors of the invention are included in the reaction mixtures, such undesirable side reactions can be completely eliminated, not simply reduced, thus providing the narrow molecular weight distributions which are one of the primary objectives of the invention. Furthermore, the use of such strong electron pair donors makes it unnecessary to resort to expensive cooling.

EXAMPLE 7

In a further example which demonstrates the effect of the addition of strong electron pair donors, two 75 mm test-tubes are charged with $1 \times 10^{-4}$ mole of an initiator, cumyl chloride, a mixed solvent consisting of 15 mls of h-hexane combined with 10 mls of methyl chloride, and $1.37 \times 10^{-2}$ mole of isobutylene. The reaction is conducted at a temperature of minus 80° C. $1 \times 10^{-4}$ mole of dimethyl sulfoxide is added to sample one, but not to sample two, and the polymerization is initiated by the addition of $1.8 \times 10^{-3}$ mole of titanium tetrachloride to each of the samples. During the reaction, additional $1.37 \times 10^{-2}$ mole quantities of isobutylene are added to the samples, at fifteen minute intervals, and after seventy five minutes of reaction time the polymerization is terminated by the addition of pre-chilled methanol. The following results are obtained.

TABLE 6

| Sample | Yield (grams) | $\overline{Mn}$ | $\overline{Mw}/\overline{Mn}$ |
|---|---|---|---|
| 1. | 3.9498 | 42700 | 1.06 |
| 2. | 3.8431 | 43400 | 1.38 |

As can be seen, while the molecular weights in the case of both samples approached theoretical, sample one, in which the dimethylsulfoxide was present, showed a much more uniform structure, i.e., a significantly narrower molecular weight distribution. Polymers displaying broad molecular weight distributions are of limited usefulness due to the higher viscosities conferred by the presence of molecular chains having non-uniform lengths.

EXAMPLE 8

In a further experiment, two samples are prepared and run under identical conditions with the exception that the first reaction is conducted at minus 40° C., while the other is carried out at minus 60° C. In both cases, the reaction is carried out in a 500 ml, 2-neck flask equipped with a stirrer. The flasks are charged with 1.16 grams ($5 \times 10^{-3}$ mole) of 1,4 bis(2-chloro-2-propyl)benzene, 0.7 ml of dimethyl sulfoxide, 200 mls of methyl chloride, and 15 mls of isobutylene. The polymerization is initiated by the addition of 8 mls of boron trichloride and allowed to continue for two hours. Polymerization is subsequently terminated by the addition of methanol. The following results are obtained.

TABLE 7

| Sample | Temperature (°C.) | $\overline{Mn}$ |
|---|---|---|
| 1. | −40 | 2570 |
| 2. | −60 | 2500 |

| $\overline{Mw}/\overline{Mn}$ | Conversion (Percent) |
|---|---|
| 1.14 | 100 |

| TABLE 7-continued | |
|---|---|
| 1.16 | 100 |

Analysis by nuclear magnetic resonance shows that in both cases, the product produced is essentially pure bi-functional polymer, having tertiary chlorine end groups at each end of the polymer chains.

A subsequent experiment carried out at minus 40° C. with identical ingredients except for the presence of the strong electron pair donor dimethylsulfoxide, leads to a polymeric product containing only about 40% by weight of the desired bi-functional polymer, which is contaminated by the presence of about 50% of the undesirable monofunctional polymer containing a tertiary chlorine end group on only one end of the polymer. The $\overline{M}_w/\overline{M}_n$ value found is undesirably high at 2.0. The experiment clearly demonstrates that undesirable self-alkylation, leading to indanyl group formation, can be avoided by stabilizing the carbocation with the addition of a strong electron pair donor.

EXAMPLE 9

In a still further experiment, two samples are prepared, the first containing the electron pair donor dimethyl sulfoxide, and the second a dimethyl acetamide electron pair donor. $1 \times 10^{-4}$ mole of the electron pair donor is used in each case. The polymerizations are carried out in 75 ml test-tubes to which has been added 15 mls of hexane, 10 mls of methyl chloride, 2 mls of the monomer isoprene, and $1 \times 10^{-4}$ mole of an initiator compound cumyl chloride. The reaction, which is conducted at minus 40° C., is initiated by the addition of $1.8 \times 10^{-3}$ mole of titanium tetrachloride, and is continued for 60 minutes. The following results are obtained.

TABLE 8

| Sample | Yield (grams) | $\overline{M}_n$ | $\overline{M}_w/\overline{M}_n$ |
|---|---|---|---|
| 1. | 0.1750 | 2050 | 1.65 |
| 2. | 0.1733 | 1960 | 1.53 |

In the case of both samples, the $\overline{M}_n$ is quite close to the theoretical value. Under similar conditions, however, in the absence of an electron pair donor, the polymerization leads to highly branched product with a molecular weight distribution of greater than ten, indicating the presence of a substantial amount of microgel. In contrast, the products of samples 1 and 2 contain no gel, and are readily soluble in conventional solvents.

EXAMPLE 10

Applicability of the invention to the formation of copolymers is demonstrated in the following experiment in which each of two test-tubes is filled with $1 \times 10^{-4}$ mole of cumyl chloride, a mixed solvent consisting of 15 mls of h-hexane combined with 10 mls of methyl chloride, and 4 mls of a mixture of isobutylene and isoprene which contains 3% isoprene and 97% isobutylene, on a volume basis. The test-tube representing sample 1 is charged with $1 \times 10^{-4}$ mole of dimethylsulfoxide, while sample 2 has $1 \times 10^{-4}$ mole of dimethylacetamide added thereto. The polymerizations are initiated by the addition of $1.8 \times 10^{-3}$ mole of titanium tetrachloride to each of the test-tubes. The reaction is continued for three hours, after which it is terminated by the addition of pre-chilled methanol. The following results are obtained.

TABLE 9

| Sample | Yield (grams) | $\overline{M}_n$ | $\overline{M}_w/\overline{M}_n$ |
|---|---|---|---|
| 1. | 0.7714 | 7200 | 1.60 |
| 2. | 0.8712 | 7700 | 1.69 |

The molecular weights obtained are those theoretically expected, and the copolymers are found to contain 1.4 mole percent of the isoprene in trans 1,4 form.

The amount of solvent employed will depend upon the viscosity of the reaction solution desired, and may be varied within fairly broad limits. Typically, however, sufficient solvent will be added to provide a reaction solution having a solids content of from about 20% to 40%, on a weight basis.

While in accordance with the patent statutes, a preferred embodiment and best mode has been presented, the scope of the invention is not limited thereto, but rather is measured by the scope of the attached claims.

What is claimed is:

1. A living polymerization process comprising initiating a polymerization by combining:

(a) an initiator component of the formula

in which $R_1$, $R_2$, and $R_3$ are selected from the group consisting of alkyl, aryl, and aralkyl groups, and can be the same or different, and X is selected from the group consisting of an acetate, an etherate, a hydroxyl group and a halogen, and i is a positive whole number;

(b) a Lewis acid component of the formula $MX_n$ in which M is titanium, aluminum, boron, or tin, X is a halogen and $n$ is a positive whle number;

(c) an electron donor component having an electron donor number of from at least about 30 to no more than about 50;

(d) a hydrocarbon olefinic monomer component; and (e) a solvent for said components, wherein there is a correlation between the polarity of the solvent or mixture of solvents employed in the reaction, reflected by their dielectric constant, said dielectric constant being about equal to, or greater than about 7, and the donor number of the electron pair donor for the reaction, wherein said components are combined in amounts such that the number of moles of the Lewis acid component present at least about equals the number of combined moles of said initiator component and said electron donor component present, and at least about one mole of electron donor component is present for about every ten moles of initiator component present, and wherein the reaction solution thus formed is maintained at a temperature below about −10° C. until the desired polymer has been formed.

2. A process according to claim 1 wherein said monomer is isobutylene.

3. A process according to claim 1 wherein said Lewis acid is a titanium halide.

4. a process according to claim 1 wherein the number of moles of Lewis acid present is greater than the combined moles of said initiator component and said electron donor component present.

5. A process according to claim 1 wherein said initiator is selected from the group consisting of 2,4,4-trimethyl-2-chloro-pentane;
2-chloro-2-phenyl propane;
1,4-di(2-chloro-2-propyl)benzene;
1,3,5-tri(2-chloro-2-propyl)benzene;
2-acetyl-2-phenyl-propane;
2-propionyl-2-phenyl-propane;
2-methoxy-2-phenyl propane;
1,4-di(2-methoxy-2-propyl)benzene; and
1,3,5-tri(2-methoxy-2-propyl)benzene.

6. A process according to claim 1 wherein said Lewis acid is titanium tetrachloride.

7. The process of claim 1 in which the weight average molecular weight, divided by the numberaverage molecular weight of a polyisobutylene prepared by the process of claim 1 in which the hydrocarbon olefinic monomer is isobutylene, is no more than about 1.15.

8. The process according to claim 1 wherein said monomer is a diolefin.

9. The living polymerization process of claim 1 wherein the x of the initiator component is a halogen.

10. A living polymerization process comprising a cationic polymerization system comprising initiating said cationic polymerization by combining:

(a) an initiator component of the formula:

in which $R_1$, $R_2$, and $R_3$ are selected from the group consisting of alkyl, aryl, and arylalkyl groups, and can be the same or different, and X is selected from the group consisting of an acetate, an etherate, a hydroxyl group and a halogen, and i is a positive whole number;

(b) a Lewis acid component of the formula $MX_n$ in which M is titanium, aluminum, boron, or tin, X of the Lewis acid is a halogen, and $n$ is a positive whole number;

(c) a hydrocarbon olefinic monomer component;

(d) a solvent for said components;

(e) an electron donor component having an electron donor number of from at least about 30 to no more than about 50 to reduce the $M_w/M_n$ ration of the polymer to less than 1.5, wherein there is a correlation between the polarity of the solvent, or mixture of solvents employed in the reaction, reflected by their dielectric constant, said dielectric constant being about equal to, or greater than about 7, said components being combined in amounts such that the number of moles of the Lewis acid component present at least about equals the number of combined moles of said initiator component and said electron donor component present, and at least about one mole of electron donor component is present for about every ten moles of initiator component present, and wherein the reaction solution thus formed is maintained at a temperature below about $-10°$ C. until the desired polymer has formed.

* * * * *